United States Patent [19]

Mein et al.

[11] Patent Number: 4,528,676

[45] Date of Patent: Jul. 9, 1985

[54] ECHO CANCELLATION CIRCUIT USING STORED, DERIVED ERROR MAP

[75] Inventors: Gordon F. Mein, Ottawa; John B. Terry, Carp; Gregory F. Hicks, Smiths Falls, all of Canada

[73] Assignee: Northern Telecom Limited, Montreal, Canada

[21] Appl. No.: 387,944

[22] Filed: Jun. 14, 1982

[51] Int. Cl.³ .............................................. H04B 3/08
[52] U.S. Cl. ....................................... 375/14; 375/13; 375/20; 375/101; 328/165; 332/37 D; 333/18
[58] Field of Search ..................... 375/11, 20, 106, 12, 375/13, 14, 18, 101, 76; 307/292; 328/63, 165; 333/18; 332/37 D

[56] References Cited

U.S. PATENT DOCUMENTS

| | | | |
|---|---|---|---|
| 3,426,281 | 2/1969 | Klein | 375/101 |
| 4,170,758 | 10/1979 | Tamburelli | 375/12 |
| 4,288,872 | 8/1981 | Tamburelli | 375/14 |

OTHER PUBLICATIONS

Angelo Luvison et al., "Theory and Implementation of Adaptive Equalizers", CH1435-7/79/0000-0251, IEEE, pp. 45.6.1-45.6.6.

Nobuo Inoue et al., "Time-Shared Two-Wire Digital Subscriber Transmission System and its Application to the Digital Telephone Set", *IEEE Transactions on Communications*, vol. Com. 29, No. 11, Nov. 1981, pp. 1565-1572.

*Primary Examiner*—Robert L. Griffin
*Assistant Examiner*—Raymond C. Glenny
*Attorney, Agent, or Firm*—J. E. Moorhouse

[57] ABSTRACT

An automatic correction circuit is responsive to suitable bit patterns in a bit stream being received from a transmission medium, to generate an error amplitude map of signal distortion being introduced by the transmission medium. The error amplitude map is digitally stored or recorded. After each non zero bit occurrence in the signal stream a synchronized output signal corresponding to the recorded error amplitude map is generated and added to the bit stream being received to reduce signal distortion, whereby information recovery from the received bit stream is improved.

5 Claims, 13 Drawing Figures

ECHO CANCELLATION CIRCUIT USING STORED, DERIVED ERROR MAP

The invention is in the field of telecommunications by means of digital signals and more particularly pertains to receiving information from a digital signal stream which may be subject to distortion while traversing a transmission medium.

In telephony, a transmission path usually referred to as a subscriber loop is used to couple a subscriber telephone station set with a telephone facility, usually a central office. The subscriber loop includes a twisted pair of wires spanning a distance between the station set and a central office subscriber line circuit. The line circuit supplies energizing direct current to the subscriber loop and provides an analog signal path for coupling voice signals between the subscriber loop and the central office.

The first widespread useage of digital signals in telephony was for transmission of dialing information via the subscriber loop to an automatic switching facility in the central office. Dialing signals consist of sequential interruptions in a flow of the energizing current along the subscriber loop. The next introduction of digital signal useage in telephony yielded improved quality and reduced cost in the area of trunk communications between central offices. A digital signal as typically transmitted via an inter-office trunk consists of a plurality of interleaved signals referred to as a time division multiplexed (TDM) signal. Each of the interleaved signals typically consists of pulse code modulated (PCM) binary signals capable of representing a voice band signal. The transmitted signal is typically a bipolar return to zero (BPRZ) signal, wherein binary signal bits of one state are represented by corresponding serial pulse signals of alternate polarity, one with respect to the next. Binary signal bits of another state are represented by an absence of the pulse signals. More recently TDM digital signal switching machines have become available for use in central, toll, and gateway offices, and in private branch exchanges (PBX). Installation of these new machines is proceeding at an accelerating pace such that the telephone networks, with the exception of the associated subscriber loops, are evolving toward all digital signal compatible networks. Hence it is a logical extension of this evolvement to expect that a practical digital signal compatible subscriber loop, for use with TDM switching machines, will also be evolved.

Transmission of digital signal information;
Over loops is a desirable situation;
But reception of same,
In a manner that's sane;
Is oft fraught with echo frustration.

It has been suggested that a suitable digital signal loop circuit capable of data transmission rates in excess of 100 kilobits per second might be provided by terminating the ends of an existing analog subscriber loop with transmitting and receiving apparatus similar to that now used for BPRZ signal communication via the typical four wire telephone TDM trunk circuits. However in contrast to the well defined uniform impedance characteristics of the typical trunk pair conductors, the impedance characteristics of subscriber loop circuits are somewhat varied. The impedance characteristics in any one loop circuit are also often non uniform through the length of a loop circuit. Loop circuit impedance discontinuities are usually the result of one or more extensions and/or bridged tap connections having been added to the loop circuit. These discontinuities are not well documented and tend to render the existing loop circuits unserviceable for digital signal transmission because each impedance discontinuity is a source of signal distortion.

Figure 1A:
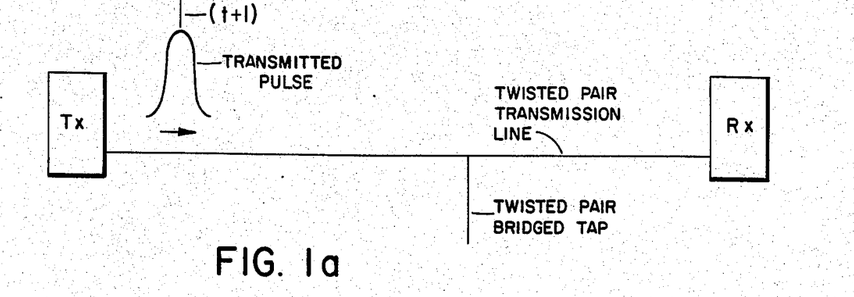
Figure 1B:
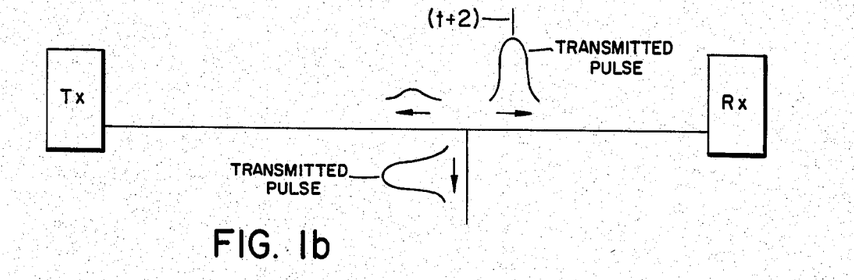
Figure 1C:
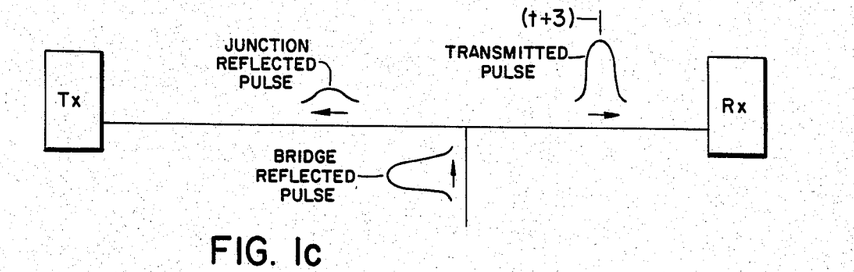
Figure 1D:
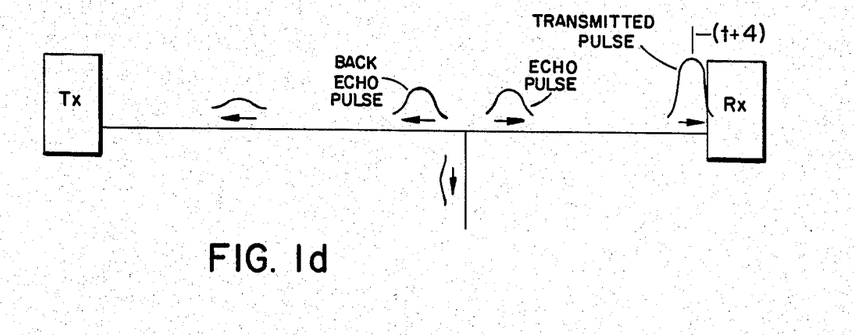

Digital signal distortions, typically caused by an impedance discontinuity, are discussed with reference to FIGS. 1a through 1d in the accompanying drawings. FIGS. 1a–1d each illustrate a BPRZ signal transmitter (Tx) and a BPRZ signal receiver (Rx) connected by a length of subscriber loop, labelled twisted pair. An example impedance discontinuity, labelled bridged tap, in the form of an open circuit twisted pair, is shown as being joined to the twisted pair intermediate the Tx and the Rx. A digital signal transmission rate of for example 600 or 700 kilobits per second vividly illustrates the signal distortion introduced by the bridged tap. In FIG. 1a, shortly after time zero at $t+1$, a positive amplitude signal pulse has just been transmitted by the Tx onto the twisted pair. In each case of an illustrated pulse there is an associated arrow showing the direction of signal propagation. At $t+2$, illustrated in FIG. 1b, most of the transmitted pulse signal has just traversed the junction of the bridged tap and the twisted pair. A small portion of the pulse signal is reflected back from the junction toward the Tx. In traversing the junction, most of the transmitted pulse signal has been split substantially evenly between the twisted pair and the bridged tap. In FIG. 1c at $t+3$, a bridge reflected pulse signal has just been reflected back from the open end of the bridged tap toward the junction while the remaining transmitted pulse signal continues toward the Rx. In FIG. 1d, at $t+4$, most of the bridge reflected pulse signal has just traversed the junction and a small portion of the bridge reflected pulse signal is re-reflected. The traversing portion of the bridge reflected pulse signal is split at the junction and propagated toward both the Tx and Rx. The portion propagated toward the Rx is labelled echo pulse and the other portion is labelled back echo pulse. Thus assuming no other losses, about half of the originally transmitted pulse amplitude signal will be received by the Rx at say $t+5$, and shortly thereafter, say at $t+6$, the echo pulse signal having slightly less than one quarter of the amplitude of the originally transmitted pulse signal is received by the Rx.

Figure 1E:
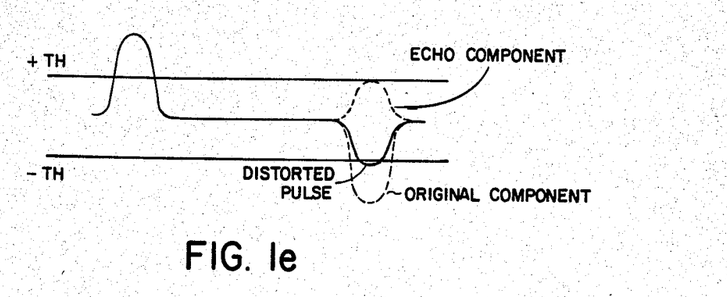

If for example a consecutive pulse signal had been transmitted in the BPRZ format it would be of opposite polarity, and it may well be that the echo and the second pulse signal would be coincident at the Rx, as illustrated in FIG. 1e. In this case the echo, labelled echo component, will have a cancelling effect which will sometimes reduce the second pulse, labelled original component, to less than a detection threshold in the Rx such that the resultant pulse, labelled distorted component goes unrecovered. The foregoing discussion has exemplified the consequences of one simple discontinuity in the loop circuit in relation to digital signal transmission. The situation is of course rendered more complex with the inclusion of an additional discontinuity, for example another bridge tap or a change of wire gauge along the length of the twisted pair.

Figure 1F:
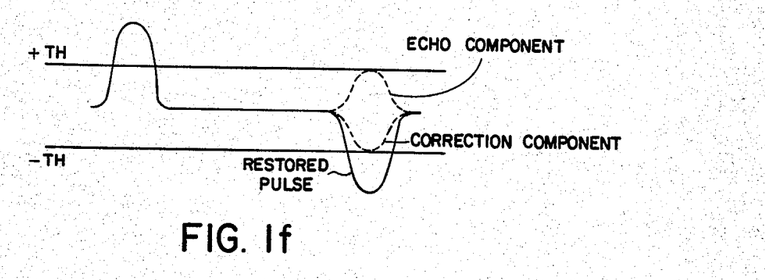

The problem of echo signals can be more or less compensated for by employing a transversal filter or a recursive filter in series with the Rx. Both of these filters employ a summing circuit arrangement wherein a received pulse signal in a signal stream, as for example is illustrated in FIG. 1f, is propagated through a delay line having a plurality of adjustably weighted taps. The sum of delayed output signals from the weighted taps produces a correction component which is added inversely at the summing circuit. The weighting of each of the taps is adjusted typically during the reception of a predetermined test pattern of pulse signals, to obtain an optimally corrected or equalized pulse signal at the output of the summing circuit. In both of these type filters the form and shape of each and every pulse signal being received is used directly in the delay line to generate an approximation of the signal distortion caused by the twisted pair conductors.

It is an object of the present invention to reduce errors in information recovery from a digitally encoded signal stream having been received from a transmission medium.

In accordance with the invention random occurrences of suitable bit patterns in a bit stream being received from a transmission medium, are utilized to generate an error amplitude map of signal distortion being introduced by the transmission medium. The error amplitude map is stored or recorded. After each non-zero bit occurrence in the signal stream a synchronized output signal corresponding to the recorded error amplitude map is generated and added to the bit stream being received to reduce signal distortion.

An automatic correction circuit is useful in combination with a line receiver for receiving a bipolar encoded bit stream. The line receiver in operation generates a corresponding binary bit stream in response to instant amplitudes of the bipolar bit stream being detected in synchronism with a mean time of each bit occurrence. The automatic correction circuit includes a summing circuit for adding a correction signal to the received bipolar encoded bit stream. A detection circuit detects isolated ONE bit occurrences in the binary signal stream. A storage system is responsive to a detection of an isolated ONE bit occurrence, to store a plural bit error byte representative of an amplitude of the received signal occurring at least at a mean time of a bit period occurrence immediately following the isolated ONE bit occurrence. A correction signal generator generates a correction signal having an amplitude being defined by the error byte and having a polarity opposite to that of the received signal corresponding to a detected ONE bit. The correction signal is generated at a time of the bit period immediately following the bit period of subsequent detected ONE bits.

FIGS. 1a through 1f of the accompanying drawings were previously discussed to illustrate the problem of echo signals commonly encountered in transmission of digital signals over existing subscriber loops and the like.

An example embodiment is described in the following with reference to FIGS. 2 through 8 of the drawings in which:

FIG. 8 1s a block schematic diagram of another example of a circuit arrangement useful as an alternative to the circuit in FIG. 7.

Figure 2:
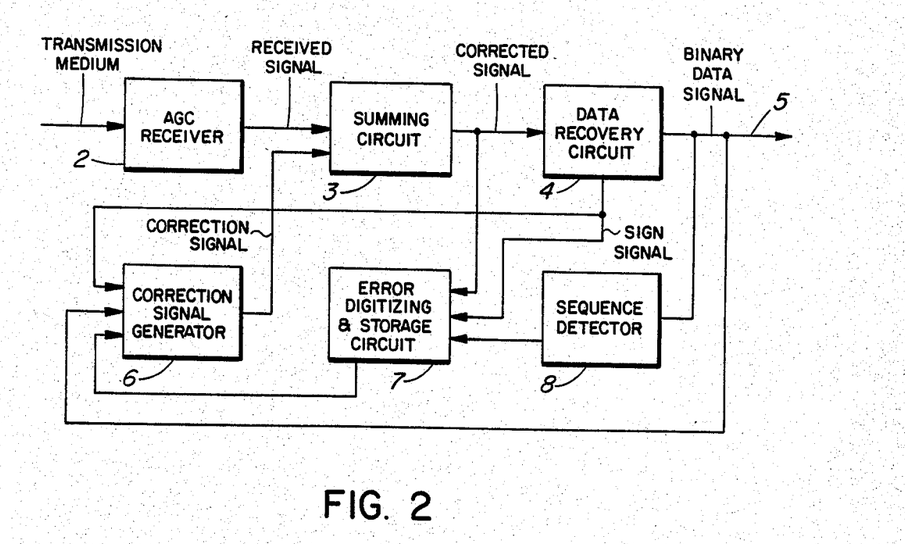
FIG. 2 is a simplified block diagram of a signal receiver in combination with an automatic correction circuit for recovering data from an encoded signal being received from a transmission medium, in accordance with the invention.
Figure 3:
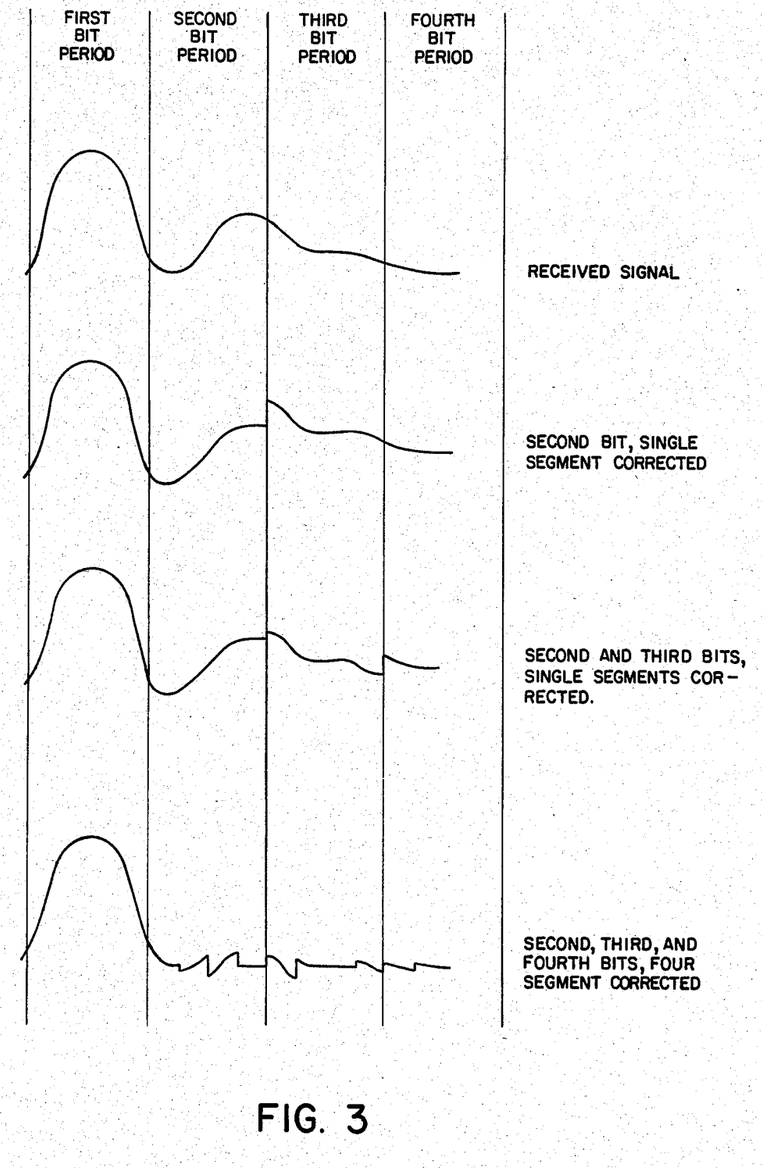
FIG. 3 is an illustration of a received signal wave form and various resultant corrected wave forms obtainable through various implementations of the invention.

Referring to FIGS. 2 and 3, an automatic gain controlled (AGC) receiver 2 amplifies bipolar encoded signals being received from a transmission medium to provide received signals of substantially constant peak amplitude. One example of a typical received signal is illustrated in FIG. 3, wherein a first bit period represents a non zero bit occurrence and the subsequent three bit periods represent zero bit occurrences. In this example the second and third bit periods include amplitude levels significantly removed from zero which are representative of typical signal distortions introduced by a typical loop circuit including a bridged tap. The received signal is passed through a summing circuit 3 where it is summed with a correction signal to produce a corrected signal. Three different possible varieties of the corrected signal in accordance with the invention are also illustrated in FIG. 3. At start up of the circuit there is no correction signal available and the corrected and received signals will thus be similar. The signal from the summing circuit 3 is detected in a data recovery circuit 4 to produce a binary data signal bit stream on a binary data signal lead 5. The data recovery circuit operates by sampling the corrected signal at about the center of each bit period, and generating a binary ONE or a binary ZERO level on the lead 5 in accordance with the amplitude of the corrected signal being more or less than a fixed threshold level. A sequence detector 8 is responsive to the binary data bit stream to indicate an occurrence of an isolated ONE bit. In the bit period immediately following, any significant displacement of the level of the signal from the summing circuit 3 is detected as being an error by an error digitizing and storage circuit 7. The error digitizing and storage circuit 7 generates an amplitude error map from the detected error and any subsequent detected errors. The data recovery circuit 4 also generates a sign or polarity signal which is used to indicate if the detected error is a result of an insufficiently corrected signal or an overcorrected signal from the summing circuit 3. The error digitizing and storage circuit 7 provides a periodic read out of the amplitude error map for use in a correction signal generator 6. The correction signal generator 6 responds to each ONE bit occurrence in the binary data signal bit stream and the corresponding sign signal to generate in at least the next bit period an analog correction signal of an amplitude level as indicated by the amplitude error map, and of a polarity opposite to that indicated by said corresponding sign signal. The instant correction and received signals are then summed algebraically in the summing circuit 3 to provide the corrected signal during at least one bit period immediately following the period of the ONE bit occurrence.

Referring again to FIG. 3, the second waveform from the top is exemplary of a single bit period correction wherein a bit is corrected to be at a proper amplitude at about the sampling instant of the data recovery circuit 4. The next lower wave form is an example of a two bit period correction resulting from a two bit period amplitude error map. The lowest wave form is an example of a correction obtainable by generating an error map consisting of four segments of correction data for each of three subsequent bit period ocurrences. It has been found that at least two segments of correction data per bit period yields a very significant reduction in error occurrences in the recovery of data from the received signal. A further significant reduction is obtained by further expanding the error amplitude map to include four or eight segments of correction data per bit period.

For clarity of description of the more detailed example embodiment illustrated in the FIGS. 4 through 8, circuit details such as power and ground connections, and clock or timing signal lead connections are only referred to where and when such may be helpful to an understanding of the invention by a person of normal skill in the field of electronic circuits. Also in the same vein, all flip flops indicated by FF in the drawings are provided by the well known D type flip flop, having data D, clock CK, inverting preset PS, and inverting clear CLR inputs. In any particular illustration of a FF, those of the inputs not shown are assumed to be connected to a positive potential via a resistance. These flip flops also include non-inverted and inverted outputs labelled with a Q and a barred Q respectively. A flip flop output not illustrated is not connected. The detailed example embodiment is briefly described with reference to FIG. 4 and thereafter described in more detail with reference to FIGS. 5, 6, 7 and 8.

Figure 4:
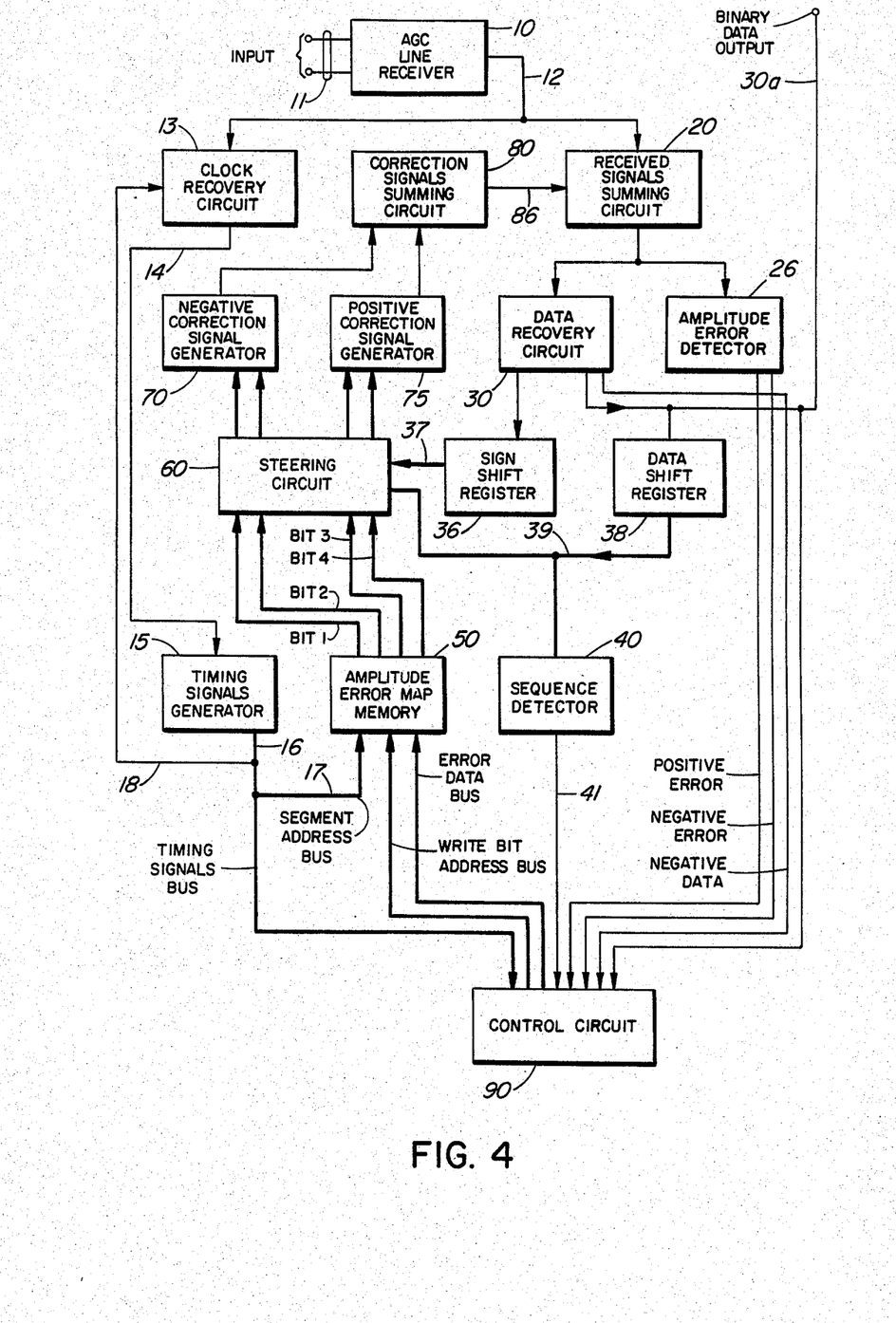
FIG. 4 is a more detailed block diagram of a digital signal receiver including a circuit for reducing errors in information recovery from a digitally encoded signal stream which is subject to distortion from echo signals and the like, in accordance with the invention.

Referring to FIG. 4, bipolar signals are received from a transmission line, not shown, via input terminals 11 and an automatic gain controlled (AGC) line receiver 10. The AGC line receiver 10 reproduces these signals with substantially uniform peak to peak amplitude and provides the reproduced signals to a received signals summing circuit 20 and to a clock recovery circuit 13 via a lead 12. The clock recovery circuit 13 is connected in combination with a timing signals generator 15 via leads 14 and 18. The timing signals generator 15 generates timing signals and the like for use by the remainder of the error reduction circuitry. These timing signals are supplied on a bus 16. The received signals summing circuit 20 adds the reproduced signal from the lead 12 with a correction signal from a lead 86 to provide a corrected signal at inputs of a data recovery circuit 30 and an amplitude error detector 26. The data recovery circuit 30 generates a recovered data binary signal which is the output signal of the digital signal receiver and is available for use by other apparatus at a binary data output 30a. The remainder of the circuitry to be described in conjunction with FIG. 4 is primarily concerned with generation of appropriate connection signals at the lead 86. The data recovery circuit 30 also generates a sign signal indicative of one of the polarities of signal excursion in the corrected signal. The sign signal is supplied to a sign shift register 36. It is also supplied via a negative data lead to a control circuit 90. The amplitude error recovery circuit 26 generates indication of positive and negative signal excursions in the corrected signal which exceed predetermined positive and negative voltage levels respectively. The positive and negative indications are coupled via respective positive and negative error leads to the control circuit 90. A data shift register 38 provides an indication of the instant data bit and a preceding seven data bits recovered by the data recovery circuit 30. The latest four of these data bits are transmitted via a bus 39 to a steering circuit 60 along with a latest four sign bits which are provided on a bus 37 from the sign shift register 36. These data and sign bits are used to operate the steering circuit 60. All eight of the data bits from the data shift register 38 are supplied to a sequence detector 40 which is responsive to a predetermined received bit sequence, for example 00010000, to provide an indication of same to the control circuit 90 via a lead 41. The control circuit 90 utilizes signals from the inputs shown connected to it to generate an amplitude error map representative of the amplitude errors peculiar to the particular associated transmission line, and stores the amplitude error map in an amplitude error map memory 50. The amplitude error map memory 50 operates to provide continuously synchronized binary error outputs corresponding to four bit periods subsequent in time occurrence to an instant detection of a ONE bit by the data recovery circuit 30. These binary error outputs are coupled to the steering circuit 60 via respective error buses labelled BIT 1, BIT 2, BIT 3 and BIT 4. The steering circuit 60 routes the binary error data signals to a negative correction signal generator 70 and to a positive correction signal generator 75 as required in response to the bit patterns presented on the buses 37 and 39. The negative and positive correction signal generators 70 and 75 convert the binary error signals to corresponding analog correction signals which are summed in a correction signals summing circuit 80 to produce the required correction signal on the lead 86. The effect of the correction signal is to reduce any echo or reflection induced distortion in the received bipolar signal such that the function of data recovery is materially enhanced.

One example of the digital signal receiver, has been constructed to receive a BPRZ signal stream at a rate of 640 kilobits per second. In this example the line receiver 10 includes a well known combination of a buffer amplifier, a fixed equalizer, and an automatic gain control circuit, all not shown, for reproducing the received BPRZ signal with an average constant peak to peak amplitude on the lead 12. The clock recovery circuit 13 includes a resonant circuit followed by a phase locked loop (PLL) circuit, all not shown, which in combination with counting circuits, not shown, in the timing signals generator 15, produces timing signals on the timing signals bus 18 in a well known manner. An example of a family of appropriate timing signals as supplied on timing bus leads T0–T6 is listed in the following table A.

TABLE A

| BUS LEAD | RATE | TIMING SIGNALS OCCURENCE | PRIMARY PURPOSE |
|---|---|---|---|
| T0 | 5.12 Mhz | CONTINUOUS | ADDRESSES |
| T1 | 2.56 Mhz | CONTINUOUS | ADDRESSES |
| T2 | 1.28 MHz | CONTINUOUS | |
| T3 | 640 KHz | CONTINUOUS | CIRCUIT SYNC. |
| T4 | 320 KHz | On demand of control circuit in response to predetermined bit | BIT ADDRESSES |
| T5 | 160 KHz | | |

TABLE A-continued

| | TIMING SIGNALS | | |
|---|---|---|---|
| BUS LEAD | RATE | OCCURENCE | PRIMARY PURPOSE |
| T6 | 80 KHz | sequence | |

Figure 5:
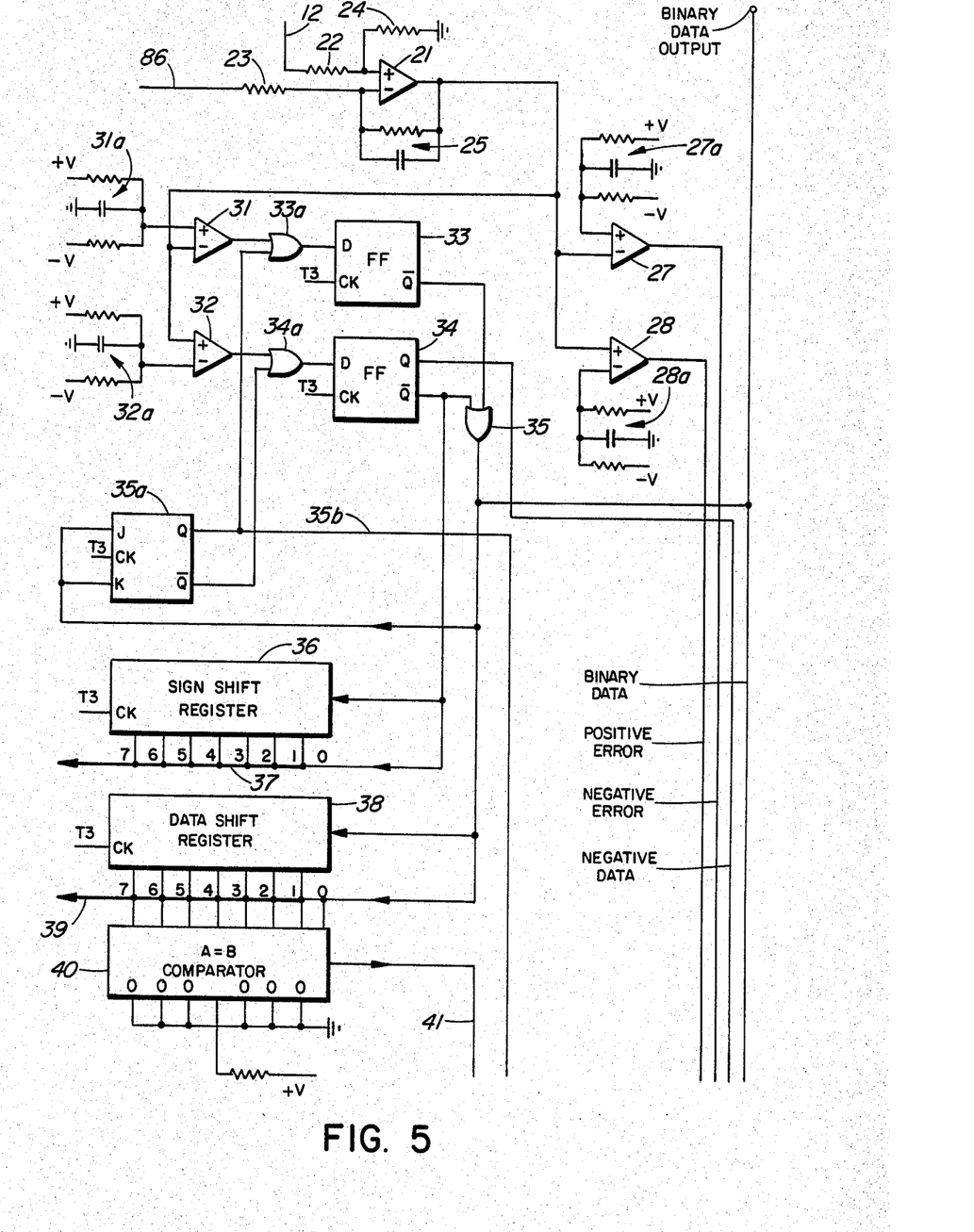
FIG. 5 is a block schematic diagram of one example of a circuit arrangement used in the digital signal receiver of FIG. 4, for recovering binary data, error amplitude, sign, and sequence information from a digitally encoded signal stream.

Elements 20 through 40 in FIG. 4 are illustrated in greater detail in FIG. 5. The received signals summing circuit 20 is provided by a differential amplifier 21 connected as shown with resistors 22 through 24 and a feedback network at 25. Signal amplitudes on the leads 12 and 86 are summed algebraically by the differential amplifier 21 to provide the corrected data signal at its output. The amplitude error detector 26 includes comparators 27 and 28 which alternately assert a signal on a positive error lead and on a negative error lead respectively in response to the corrected data signal being in excess of a negative threshold or a positive threshold as determined by respective d.c. voltage dividers at 27a and 28a. The data recovery circuit 30 includes comparators 31 and 32 which respond to positive and negative signal amplitudes respectively exceeding levels as determined by positive and negative d.c. voltage dividers at 31a and 32a. Output signals from the comparators 31 and 32 are near ground potential when asserted. D type flip flops 33 and 34, OR gates 33a, 34a and 35, and a JK type flip flop 35a, connected as shown, operate to capture binary data corresponding to the normal alternate polarity encoding of a BPRZ signal stream. This arrangement of gates and flip flops renders the error mapping function non operative in the presence of bipolar violation occurrences in the BPRZ signal being received. Such violation may have been intentionally transmitted or may be the result of an extreme combination of discontinuities in a particular transmission line. The outputs of the JK flip flop 35a permit one or the other of the negative logic output signals from the comparators 31 and 32 to be clocked into the corresponding flip flop 33 or 34. The inverted outputs of the flip flops 33 and 34 are connected to inputs of the OR gate 35. A positive logic signal assertion at the output of the OR gate 35 represent a detected ONE bit in a binary signal stream corresponding to the data content in the received BPRZ signal. Each detected ONE bit causes the JK flip flop 35a to toggle such that only the alternate polarity signal excursion in the BPRZ signal will be next detected as a ONE bit.

The inverted output of the flip flop 34 is also connected to a sign shift register 36 and comprises one lead of an eight lead bus 37. The other seven leads of the bus 37 are connected to outputs of the sign shift register 36. The sign shift register 36 is clocked for its operation by the 640 KHz timing signal from the lead T3 in the previously mentioned timing signal bus 18. Binary data, indicative of negative signal excursions in the BPRZ signal stream, is clocked through the sign shift register 36 to yield a record of an instant received bit and the preceding seven received bits on the bus 37. The output of the OR gate 35 is also connected to an input of a data shift register 38 and comprises one of eight leads in a bus 39. The other seven leads of the bus 39 are connected to outputs of the data shift register 38. The data shift register 38 is clocked for its operation by the 640 KHz timing signal from the lead T3. The binary data signal stream is clocked through the data shift register 38 to provide a record of the instant binary data bit and the preceding seven binary data bit occurrences, on the bus 39. An A=B digital comparator circuit 40 includes a group of eight inputs connected to the leads in the bus 39, and a group of inputs connected as shown to power and ground to define a predetermined sequence. In this example a sequence of three ZERO bits followed by a ONE bit followed by four ZERO bits is detected. The digital comparator circuit 40 also includes an output from which an A=B match is signalled on the lead 41 to the control circuit 90. Although the second mentioned input group of the digital comparator circuit 40 is shown as being hardwired, this input group may alternately be connected to the control circuit 90, to be controlled such that various other sequences are also detectable.

Figure 6:
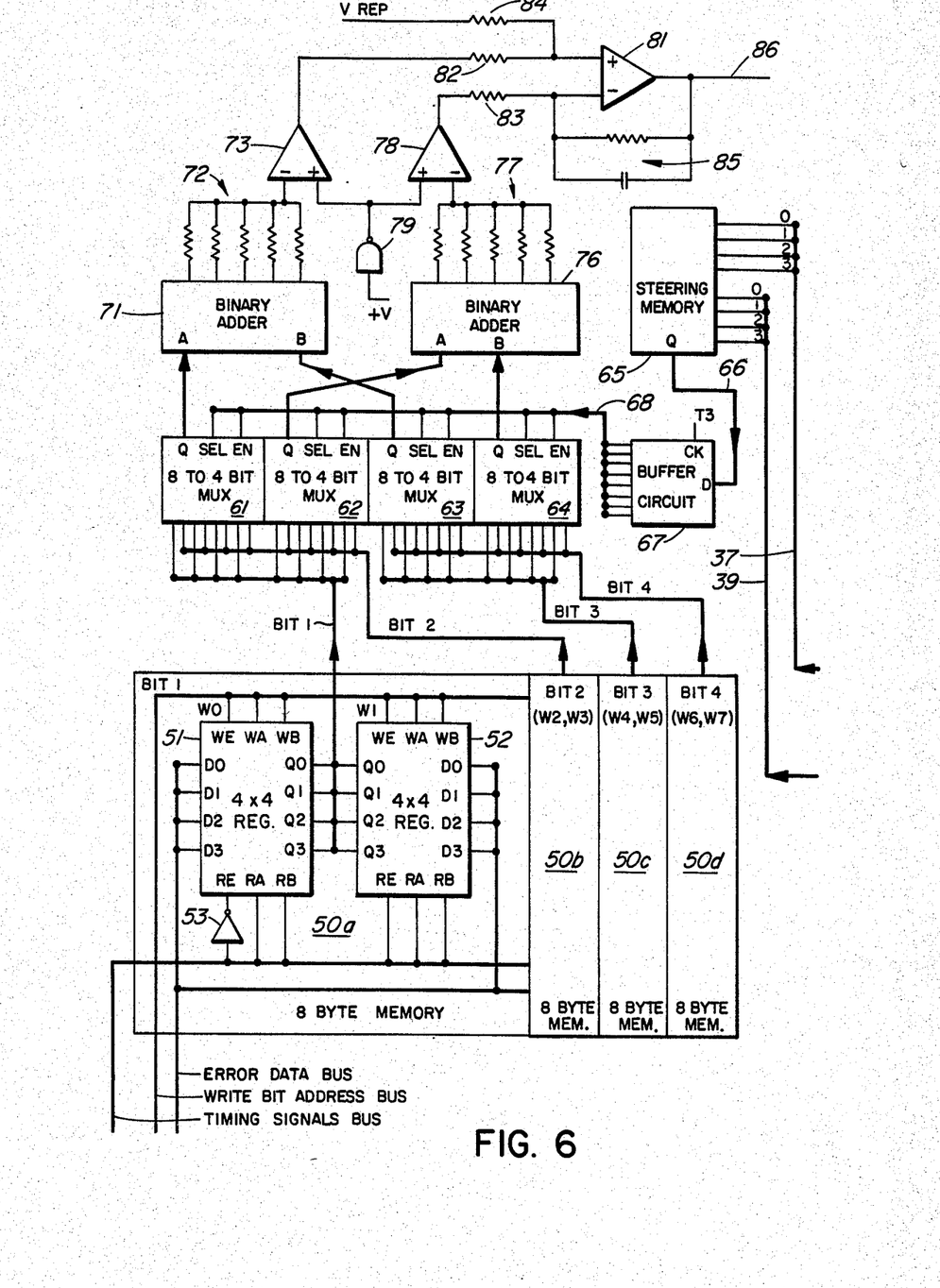
FIG. 6 is a block schematic diagram of one example of a circuit arrangement, used in the digital signal receiver in FIG. 4 for storing an error amplitude map and generating correction signals therefrom.

Those elements in FIG. 4 labelled with numerals 50 through 80 are illustrated in more detail in FIG. 6. The amplitude error map memory 50 is provided for by four eight byte memory circuits 50a, 50b, 50c and 50d. Each of the memory circuits 50a–50d includes sufficient memory space to store an eight segment correction map corresponding to a data bit period in the BPRZ signal stream. Each eight byte memory circuit in this example includes a pair of 16 bit register circuits 51 and 52. One example of a suitable register circuit is that generally known by product code 74LS670. The registers 51 and 52 each include a read enable input RE which when asserted causes a readout of four out of sixteen storage locations as selected via read address inputs RA and RB. The readout signals appear at outputs Q0–Q3. The read inputs RE, RA and RB are connected to the timing signal bus leads T2, T0 and T1 respectively, with the read enable input RE of the register 51 being connected in series with an inverter 53. In operation the registers 51 and 52 in each of the eight byte memories 50a–50d are alternately read in a synchronized sequential manner such that memory information pertaining to the bit periods 1 through 4 is simultaneously available on the output buses which are correspondingly labelled BIT 1, BIT 2, BIT 3, and BIT 4. The registers 51 and 52 each also include a write enable input WE which when asserted causes storage of the states of data inputs D0–D3 at four out of the sixteen storage locations as selected via write address inputs WA and WB. The write enable input WE of each of the registers in the amplitude error memory map 50 is connected to a respective one of leads W0–W7 in a write bit address bus, as shown. In operation, the control circuit 90 is thus able to cause error data supplied via the error data bus, to be stored at any storage location independent of the instant readout function of the amplitude error map memory 50.

The steering circuit 60 includes eight bit to four bit multiplexors 61–64 each having inputs connected as shown to the outputs of the memories 50a–50d. A steering memory 65 generates control signals on a bus 66 in accordance with the data bit occurrences on the bus 39 and the negative sign bit occurrences on the bus 37 all of which correspond to the instant bit period and the preceding three bit periods in the BPRZ signal stream. The steering memory 65 is shown as a read only memory (ROM) and in the instant example generates the control signals in accordance with the listing as shown in hexidecimal notation in table B.

TABLE B

| STEERING ADDRESS | STEERING CONTROL SIGNALS |
| --- | --- |
| 00 | 77 |
| 10 | 57 |
| 11 | A7 |
| 20 | 97 |
| 22 | 67 |
| 31 | 87 |
| 32 | 47 |
| 40 | 75 |
| 44 | 7A |
| 51 | A5 |
| 54 | 5A |
| 62 | 65 |
| 64 | 9A |
| 72 | 45 |
| 75 | 8A |
| 80 | 79 |
| 88 | 76 |
| 91 | A9 |
| 98 | 56 |
| A2 | 69 |
| A8 | 96 |
| B2 | 49 |
| B9 | 86 |
| C4 | 78 |
| C8 | 74 |
| D4 | 58 |
| D9 | A4 |
| E4 | 98 |
| EA | 64 |
| F5 | 88 |
| FA | 44 |

A buffer circuit 67 distributes the control signals across select and enable control inputs of the multiplexers 61–64 in synchronism with the 640 KHz timing signal from the lead T3. Accumulated propagation delay in the memory 65 and in the preceding circuits, in combination with the synchronization of the buffer circuit 67, has the effect of delaying the control signals by a full bit period. Hence the control signals pertain to the four bit periods preceding the instant bit period.

In the negative correction signal generator 70, a binary adder 71 sums error data from the multiplexers 61 and 63. The summed data is converted to an analog potential in a resistance network 72 and amplified with a constant gain by a differential amplifier 73 in combination with a resistor 73a to provide the negative correction signal. In the positive correction signal generator 75, a binary adder 76 sums error data from the multiplexers 62 and 64. The summed data is converted to an analog potential in a resistor network 77 and amplified with a constant gain by a differential amplifier 78 in combination with a resistor 78a to provide the positive correction signal. Both the differential amplifiers 73 and 78 include reference inputs connected in common to an output of a permanently ON NAND gate 79 so that ON gate error in the binary adders 71 and 76 is substantially cancelled in the resulting negative and positive correction signals.

The negative and positive correction signals are respectively coupled via resistors 82 and 83 to non-inverting and inverting inputs of a differential amplifier 81. The non-inverting input is also connected to a voltage reference source (VREF) by a resistor 84. A feedback network at 85 determines the amplification characteristics of the differential amplifier 81 in a well known manner. The analog correction signal obtained at the output of the differential amplifier 81, on the lead 86, is a virtual complement of bridged tap induced distortion signals and the like being received by the line receiver 10 in FIG. 4.

The form of the analog signal is defined as was previously described in accordance with data bytes stored in the amplitude error map memory 50. Also as previously mentioned the data bytes are generated by the control circuit 90 in response to predetermined sequence occurrences and signals from the data recovery circuit 30 and the amplitude error detector 26.

Figure 7:
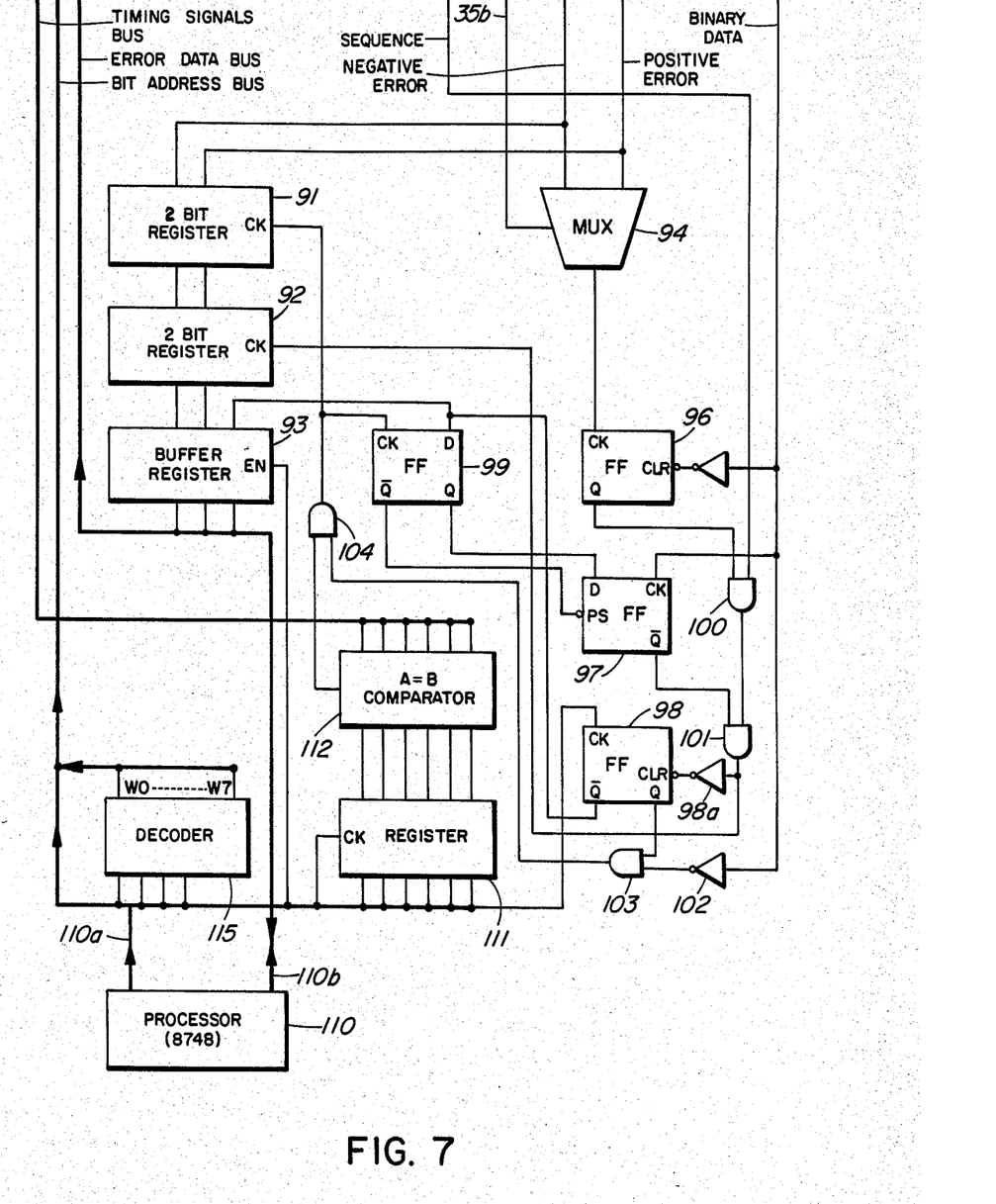
FIG. 7 is a block schematic diagram of one example of a circuit arrangement, used in the digital signal receiver in FIG. 4 for generating the error amplitude map.

Two examples of the control circuit 90 are discussed with reference to FIGS. 7 and 8. Referring to FIG. 7 a processor 110 is operated in accordance with an instruction set in an internal memory to accumulate error data in association with each of one or more bit periods following a ONE bit occurrence in the received BPRZ signal stream. An example of a suitable processor is a microprocessor known by product code 8748. The illustrated example in FIG. 7 is arranged to provide thirty-two error data bytes each corresponding to a respective one eighth segment of one of four consecutive bit periods. The remaining elements in FIG. 7 are used to interface the processor 110 with the real time functions of the previously described circuit operation. Elements 96 through 99 consist of well-known D type flip flops (FF) connected as shown. In operation, one of positive and negative error signal inputs is selected by a multiplexer 94 in response to the state of the non inverted output of the JK flip flop 35a, in FIG. 5, connected via a lead 35b. The FF96 is cleared via an inverter 95 during a binary data ONE occurrence on the binary data lead and thereafter will have its inverted output clocked high in the event that the selected error lead at the multiplexer 94 becomes asserted. If an indication of the required sequence occurs on the sequence lead when the output of the FF96 is high, the sequence indication is gated via an AND gate 100 to an input of an AND gate 101. The FF97 is used to gate the sequence indication through the AND gate 101 in the event that the processor 110 is ready to process an error signal. In this case the FF97 has been clocked SET by the binary data ONE occurrence since the FF99 non inverted output will have been clocked high. When the FF97 output is high and the sequence indication is passed by the AND gate 101 to clear the FF98 via an inverter 98a and to clock a two bit register 92. This causes the two bit register 92 to register the state of a two bit register 91. The state of the two bit register 92 is accessible by the processor 110 via a buffer register 93 and a bidirectional bus 110b connected therebetween. Access is effected when the processor asserts an enable signal to an enable input EN of the buffer register 93 via a lead in a control bus 110a. Also at the moment of access, the state of the inverted output of the FF98 is available to the processor via the buffer register 93. This provides an indication to the processor as to whether or not the state of the register 92 is representative of new error data requiring processing or old error data which will have already been processed. When the sequence indication has been passed by the AND gate 101, as previously described, the two bit register 91 becomes available to receive error data from the positive and negative error leads. The two bit register 91 is controlled to register the state of the error leads at a time defined by the processor 110 after the occurrence of a binary data ONE. However this will only occur if the processor 110 is ready. As the non inverted output of the FF98 has been cleared low via the inverter 98a, it prevents the register 91 and the FF99 from being clocked via AND gates 103 and 104 until the FF98 is clocked SET by the processor 110 via a lead in the control bus 110a. The inverter 102 also inhibits clocking of the register 91 and the FF99 during a subsequent binary data ONE occurrence which happens to overlap the time defined by the processor 110.

The processor 110 starts by processing detected error during the first of the thirty-two periods, hereinafter termed segments, each segment corresponding to an eighth of a bit period in the BPRZ bit stream. The result of each processed error is supplied to the amplitude error map memory 50 via the bus 110b which corresponds to the error data bus in FIGS. 4 and 6. The address location for storage of the result is defined by the processor 110 in combination with a decoder 115. The address is supplied to the memory 50 via leads in the control bus 110a which are connected to the bit address bus. Only after an accumulation of error occurrences sufficient to generate an error data byte to be stored in the memory 50, which is of a value to prevent regularly detected errors, will the processor 110 proceed to processing in relation to the next segment, and so on. The instant segment being processed is time defined by a segment address generated in the processor 110 and stored in a register 111 via leads in the control bus 110a. Outputs of the register 111 are compared with the six timing signals from the leads T0–T5 by an A=B digital comparator 112, such that at the instant of the addressed segment occurrence an output of the comparator 112 is asserted. The asserted output of comparator 112 is passed by the AND gate 104, and clocks the register 91 to store the instant states of the positive and negative error leads. At the same time the output of the AND gate 104 causes the FF99 to be clocked such that its non inverted output is low. Thus the FF97 will be clocked on the next binary data ONE occurrence with its output high. While the FF97 output is high, a sequence indication can be passed by the AND gate 101 which in turn causes the register 92 to be loaded with error data which is acceptable for use by the processor 110.

The embodiment as having been described in the foregoing, is exemplary of one apparatus and method for reducing distortion in digitally encoded signals of the BPRZ type or format, as these signals are being received from a transmission medium. However the principles of distortion cancellation as hereinbefore described are useful in any situation wherein a received signal includes predominately predefined discrete signal levels and at least an occasional occurrence of an isolated transition between any two of the signal levels.

Figure 8:
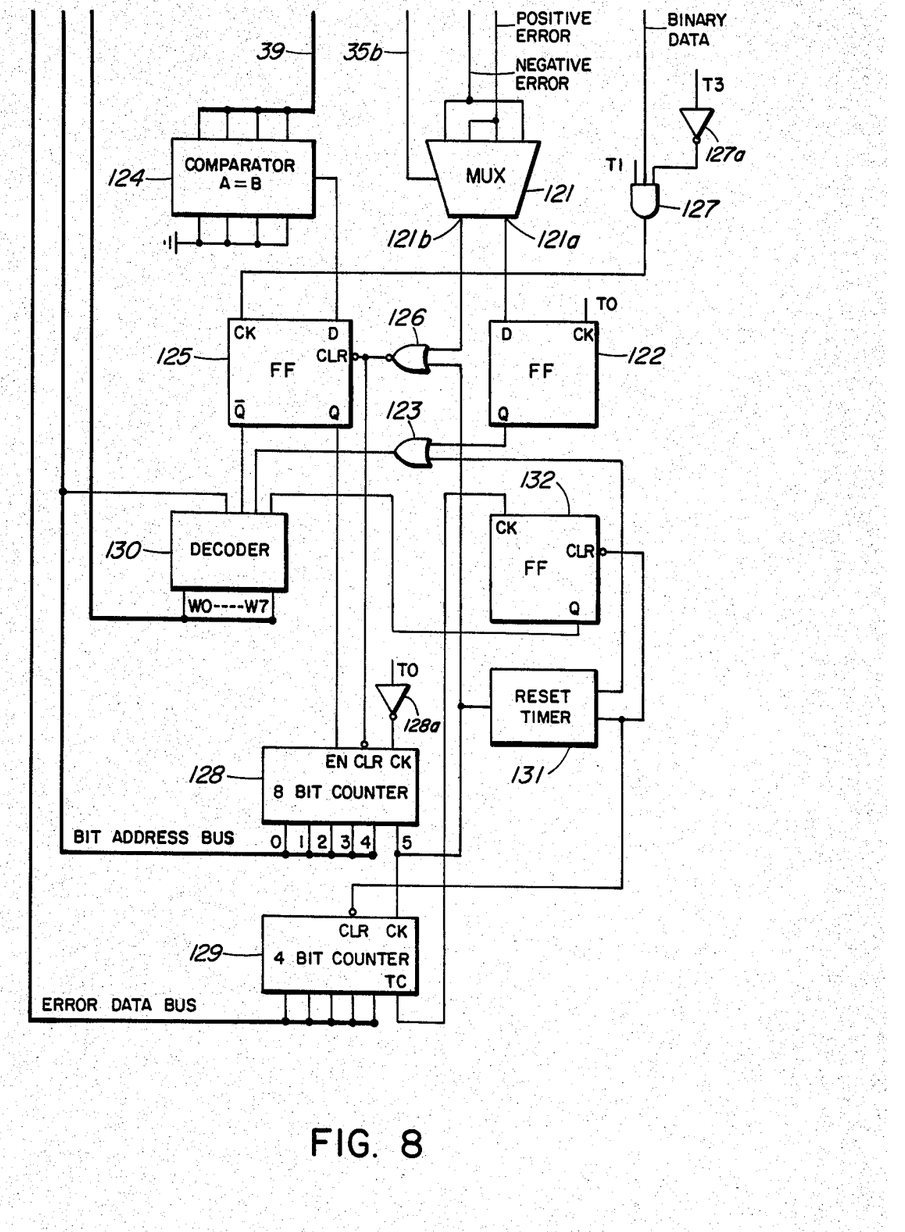

The alternate example of the control circuit in FIG. 8 is comprised solely of hardware elements in contrast to the processor 110 in FIG. 7 which requires an instruction set for its operation. Although the control circuit in FIG. 8 does not have the flexibility of function possible with the use of the processor 110 as in FIG. 7, it was designed after some experience with the control circuit in FIG. 7 to provide what appears to be a preferred mode of operation at the 640Kb/s transmission rate. The control circuit in FIG. 8 has also been designed to be more adaptable to being integrated in solid state circuitry for mass production. Also in contrast to the operation of the control circuit in FIG. 7 wherein each of one of 32 error segments is mapped on a sequential basis, it will be seen that the control circuit in FIG. 8 maps the error segments in parallel thus providing a more quickly optimized connection function.

The control circuit in FIG. 8 is used to recognize a predetermined sequence of detected binary data bits, 000010000, defining an isolated ONE data bit. Error detection after the occurrence of the isolated ONE data bit and of the same polarity as the isolated ONE data bit cause addresses to be generated for writing the contents of a four bit counter 129 into the amplitude error map memory 50. Each subsequent predetermined sequence occurrence causes the contents of four bit counter 129 to be incremented and written into the amplitude error map 50 until no further error detection occurs. In the unlikely event that a full count is insufficient to prevent an error detection, operation of the four bit counter 129 is arrested at the full count to prevent it from returning to zero count. Also in the event that a bridged tap is removed from the associated loop circuit, consequent error detection of the opposite polarity causes the register 129 to be cleared to all zeros along with the amplitude error map memory 50, and the process of error mapping is reinitialized.

Considering the control circuit in FIG. 8 in more detail, a multiplexor 121 passes the signal state of the positive and negative error leads to its outputs 121a and 121b respectively and vice versa, in accordance with the signal state of the non inverted output of the JK flip flop 35a, in FIG. 5, connected via the lead 35b. A FF122 is clocked by the 5.12 MHz timing signal from the lead T0 to follow the signal state of the output 121a. An output of the FF122 is ORRED in an OR gate 123 to provide an inhibit signal to a decoder 130, in the event that no error or an error of the wrong polarity is being detected. A comparator 124 is connected to indicate an all zero state occurring on the leads 1 through 4 of the bus 39. The all zero indication is clocked into a FF125 by a ONE bit binary data occurrence being received through an AND gate 127 which is under the control of the 2.56 MHz timing signal from the lead T1 and the 640 KHz timing signal from the lead T3 being inverted by an inverter 127a. A non inverted output of the FF125 is connected to an input of the decoder 130 and an inverted output of the FF125 is connected to an enable input EN of an eight bit counter 128. The output 121b is connected to an input of a NOR gate 126, another input of which is connected to an output of the sixth stage of the eight bit counter 128. In the event that a signal assertion appears at the output 121b, or the counter 128 reaches a count of thirty two, the NOR gate 126 causes the FF125 to be forced to its cleared state via its clear input CLR. Simultaneously the counter 128 is likewise cleared via its clear input CLR and is inhibited from counting the 5.12 MHz timing signal being supplied from the lead T0 to a clock input CK of the counter 128 via an inverter 128a. While the counter 128 is enabled, each time it reaches a count of thirty-two the four bit counter 129 is incremented by one count via a signal assertion at its clock input CK. At the same time a reset timer 131, for example a retriggerable monostable circuit, is reinitiated. If a considerable period of time passes without a valid sequence, i.e. 0000, being detected by the comparator 124, the reset timer 131 times out which causes the 4 bit counter 129 to be cleared to all ZEROs and the decoder 130 to be enabled. This causes the 8 bit counter 128 to generate all the amplitude error map memory address locations which erases the map to all ZEROs so that the correction process is reinitiated. On the other hand, if the reset timer 131 continues to be reinitiated and the four bit counter 129 is incremented once beyond a full count, its carry output TC becomes asserted. The asserted carry output TC causes a FF132 to be clocked high at its non inverted output to disable the decoder 130. This prevents further writing of the amplitude error memory map 50 until such time as the reset timer 131 times out and causes the non inverted output of the F132 to be cleared low.

In the foregoing it is illustrated that the invention provides for signal correction during a bit period occurrence subject to signal distortion stemming from a prevailing signal state in a preceding bit period occurrence. In a lower bit rate digital transmission system, significant distortion is typically encountered in the latter half of an instant bit period, as well as in one or more bit periods subsequent thereto. In this case the invention is also useful. For example one variation of the invention is the use of the error reduction circuit in combination with a simple adjustable filter or the like being located in the line receiver for cancelling distortion stemming from and coexistent with a data bit during the instant bit period. Other variations and implementations within the scope of the invention will become apparent to persons skilled in this art.

What is claimed is:

1. A method for reducing errors in information recovery from an encoded signal stream being received from a transmission medium and including transitions between more than two logic levels and thus including various types of corresponding transitions, the method comprising the steps of:

predetermining storage facility for the subsequent separate storing of a delayed component corresponding to each of the various types of transitions;

detecting the particular type of transition occurrence in the received encoded signal stream;

detecting a delayed component of a transition in the signal stream;

subsequently storing a digital representation of the detected delayed component at the predetermined corresponding storage facility and;

in response to each subsequent occurrence of the transition in the signal stream, generating an analog cancellation signal defined by a reading of the stored digital representation from the corresponding storage facility and adding the analog cancellation signal to the encoded signal stream as it is being received, to reduce distortion effects of delayed components of said subsequent occurrences of the transition in the received signal stream.

2. A method for improving information recovery from digitally encoded signals consisting of bipolar return to zero (BPRZ) signals in a receiver of the digitally encoded signals which includes a detector wherein a received signal excursion of less than a predetermined limit of positive and negative polarities is detected as information of a zero state and a received signal excursion of more than the predetermined limit is detected as information of a non zero state, the method comprising the steps of:

(a) defining a zero limit of positive and negative polarities each being between the respective polarities of the predetermined limit and zero;

(b) detecting a bit occurrence of the non zero state and a polarity of said bit occurrence when said bit occurrence was preceded by a continuous occurrence of the zero state through at least a first predetermined period of time;

(c) storing an indication of a signal excursion of the same polarity as detected in step (b) and which is in excess of the zero limit and occurring within a second predetermined period of time following the detection of the bit occurrence of the non zero state and during which continuous detection of the zero state prevails; and (d) in response to a subsequent detection of a bit occurrence of the non zero state, algebraically adding a signal, corresponding to the stored indication and of opposite polarity to the received signal excursion of the non zero state, to the digitally encoded signal being received by the detector during a period of time corresponding to said second period of time and following the subsequent non zero bit state detection, whereby signal amplitude of a delayed remnant of the non zero signal excursion is reduced toward the zero limit.

3. An automatic correction circuit for use with a pulse encoded signal receiver including a receiver circuit for receiving pulse encoded signals from a transmission medium, a timing circuit responsive to the pulse encoded signals for generating timing signals and a data recovering circuit for generating a binary data bit stream in response to signals from the receiver circuit and the timing circuit, and a summing circuit for combining the received pulse encoded signal with a correction signal from the correction circuit, the automatic correction circuit comprising:

first means for generating an error amplitude map record representative of greater than zero amplitude during a zero bit occurrence following a non zero bit occurrence in the signals from the receiver circuit the first means including, an error detector for generating respective negative and positive error indications in response to a bipolar return to zero (BPRZ) signal being received from the transmission medium and being in excess of one of predetermined negative and positive error threshold levels, a first shift register having a serial input for receiving the binary data signal stream and parallel outputs for providing a record of a plurality of consecutive past occurring data bits, a sequence detector responsive to a predetermined sequence of data bits at the parallel outputs of the first shift register for generating an indication of a plurality of zero bit occurrences followed by a non zero bit occurrence and followed by a plurality of zero bit occurrences being detected by the data recovery circuit, an error memory for storing a segmented error map and providing a continuous readout of same, and a control circuit being responsive to a detection of a non zero bit occurrence by the data recovery circuit to temporarily store an error indicated by the error detector at a selected instant of time after said detection, and thereafter in response to a sequence indication from the sequence detector, for accumulating the error indication within a segment of the error memory at the selected instant in time being indicated by a corresponding instant state of the timing signals from the timing circuit, the control circuit also being responsive to an absence of error indication at the selected instant in tim, to select a subsequent instant in time; and second means for generating a synchronized amplitude correction signal corresponding to the map record in response to a non zero bit occurrence in the data bit stream from the data recovering circuit; and the summing circuit being connected in series between the receiver circuit and the data recovery circuit for generating a corrected pulse encoded signal from a summation of signals from the receiver circuit and the synchronized amplitude correction signal, whereby in the operation of the data recovery circuit error occurrences are reduced.

4. An automatic correction circuit as defined in claim 3 wherein the data recovery circuit includes means for generating a sign signal stream concurrent with a BPRZ signal being received and detected for indicating recovered one bits which were of a predetermined signal polarity in the BPRZ signal; and wherein the second means comprises:

a second shift register having a serial input for receiving the sign signal stream and parallel outputs for providing a record of past occurring signals of said predetermined polarity;

correction signal generation circuitry having negative and positive input ports for receiving selected signal indications of the error amplitude map record from the first means;

a steering memory for providing steering signals in response to the states of the parallel outputs of the second shift register and a corresponding past plurality of bits in the binary data bit stream; and a steering circuit for selectively coupling the signal indications from the first means to the correction signal generator in response to the steering signals.

5. An automatic correction circuit for use with a pulse encoded signal receiver including a receiver circuit for receiving pulse encoded signals from a transmission medium, a timing circuit responsive to the pusle encoded signals for generating timing signals and a data recovery circuit for generating a binary data bit stream in response to signals from the receiver circuit and the timing circuit, and a summing circuit for combining the received pulse encoded signal with correction signal from the correction circuit, the automatic correction circuit comprising:

an error memory for storing a segmented error map for use in cancellation of distortion in the received pulse encoded signals;

an error detector for generating respective positive and negative error indications in response to bipolar return to zero pulse encoded signals being received from the transmission medium and being in excess of one of predetermined positive and negative error threshold levels;

means for detecting and indicating an occurrence of an isolated non zero data bit being preceded by at least a predetermined plurality of zero data bits;

address generating means including a first counter for generating a sequence of addresses for defining memory location to be written in the error memory, the address generating means including circuit means being responsive to an indication from the isolated non zero data bit occurrence detector means to start the first counter and being responsive to a subsequent non zero data bit occurrence prior to completion of the address sequence to clear the first counter;

error correction data generating means including a second counter being incremented in response to each occurrence of a complete address sequence from the first counter;

gating means being responsive to an instant error indication, from the error detector, of an error being of a polarity corresponding to the polarity of the isolated non zero data bit occurrence, for causing writing of the state of the second counter at an address defined memory location in the error memory corresponding to the instant address being generated by the first counter;

means for generating a synchronized amplitude correction signal corresponding to the error map in response to a non zero bit occurrence in the data bit stream from the data recovery circuit; and the summing circuit being connected in series between the receiver circuit and the data recovery circuit for generating a corrected pulse encoded signal from a summation of signals from the receiver circuit and the synchronized amplitude correction signal, whereby in the operation of the data recovery circuit error occurrences are reduced.

* * * * *